Patented June 25, 1963

3,095,277
DIAGNOSTIC COMPOSITION
Alfred H. Free, Elkhart, and Mary Lou Kercher, Goshen, Ind., assignors to Miles Laboratories, Inc., Elkhart, Ind., a corporation of Indiana
No Drawing. Filed Mar. 25, 1958, Ser. No. 723,662
8 Claims. (Cl. 23—253)

This invention relates to an indicator for the detection of albumin in liquids, and relates particularly to indicator bodies or compositions having utility in the qualitative and semi-quantitative determination of albumin in body fluids, such as urine.

The presence of albumin in urine has long been known to be an indication of a diseased or traumatic condition, and many tests for the detection of albumin have been developed. In most of these tests, the urine specimen is treated with an albumin precipitant, such as nitric acid, sulfosalicylic acid, picric acid or acetic acid with heat, and the presence of albumin is indicated by the formation of a precipitate, the volume or density of which is dependent on the amount of albumin present.

In all such tests, wherein the precipitation of albumin is an essential step, some laboratory apparatus is required, and the testing procedures are further complicated by the necessity of preparing and handling the corrosive reagents required. Furthermore, when it is desired to conduct a large number of albumin determinations by the aforementioned precipitation tests, the greatly multiplied manipulative steps required by such a series of tests demands the services of a correspondingly large staff of technicians, if the results are to be known within a reasonable time.

It would obviously be of advantage to devise a test for albumin which would not require any specialized apparatus or liquid reagents other than the specimen being tested, and which could be conducted easily and reliably even by unskilled persons. Accordingly, it is an object of the invention to provide a solid, dry indicator composition, which incorporates all the reagents necessary for determining the presence of albumin in liquids, and which will reduce the manipulative steps required for such determination to the simple act of applying to such composition a small quantity of the liquid to be tested.

An additional object is to provide an indicator composition of the type referred to in the previous object, which is conveniently fabricated from bibulous material which may take the form of thin absorbent sheet material, such as paper, impregnated with a reagent which, upon contact with the liquid to be tested, will undergo a color change if albumin is present.

A further object is to provide an indicator body or composition having utility in testing for albumin in urine, which will permit quick and reliable determinations to be made even by unskilled persons, without special facilities.

The principle underlying the present invention is the phenomenon of "protein error" exhibited by certain indicators whereby, in the presence of proteins, such indicators will undergo their characteristic color changes at lower pH values than that at which they will change color in the absence of protein. That is to say, an indicator which exhibits protein error will, in a solution containing protein, by its color indicate a higher pH value for such solutions than is actually the case, and the extent to which the characteristic color-change point of the indicator is shifted is some indication of the amount of protein in the solution.

In accordance with the invention, therefore, we prepare our indicator compositions preferably by impregnating strips of absorbent carrier material, such as filter paper, with an indicator dye which exhibits protein error, and a buffer effective when the carrier is wetted with, say, a urine specimen (i.e., a liquid having a pH of about 4.5 to pH 8.5) to maintain the carrier and dye at a pH value adjacent to, but on the acid side of, the point at which the color change of the dye normally occurs. The color exhibited by the indicator composition prior to an albumin test is, therefore, that color which is characteristic of the dye at the pH just below the color-change point. When such an indicator composition is moistened with a liquid to be tested, if the liquid does not contain protein (albumin) the composition does not change color; on the other hand, if the liquid does contain protein, the protein error of the dye takes effect, and a color characteristic of a somewhat higher pH is formed, which results in a change in color of the indicator composition.

An indicator composition, according to the invention, is most conveniently prepared by imjregnating the filter paper carrier strip with a solution of the indicator dye and buffer, and thereafter air-drying the impregnated carrier. As would be expected, only a small amount of indicator dye is needed to adequately color the carrier strips in use. We have found, for example, that carrier strips are adequately colored by wetting them with an impregnating solution containing about 0.005% to about 0.3%, and preferably 0.01% to 0.07%, by weight, of the dye. However, these dye proportions are not critical, and somewhat higher or lower proportions may be used if desired.

The proportion of buffer in the impregnating solution, which buffer in our "preferred" embodiments takes the form of solid acids or acid salts, will of course vary with the particular buffer used and with the pH value at which it is desired to buffer the carrier and dye. We have found that when urine is the liquid to be tested for albumin, using the buffers hereinafter identified, a carrier strip which is suitably buffered to any pH that may be required by the usual indicator dyes, may be prepared by wetting the carrier with an impregnating solution containing about 0.5% to about 25%, preferably 1.0% to 8:0%, by weight of the buffer, and thereafter drying the carrier. However, buffer concentrations outside that range may of course be employed, if necessary.

The following examples are illustrative of the indicator compositions of the invention and of the method of preparing them:

*Example I*

One-half ml. of a 0.1% alcoholic solution of tetrabromophenolphthalein ethyl ester is mixed with 0.5 ml. of a solution containing 35 mg. of a sodium citrate-citric acid mixture (27% sodium citrate-dihydrate and 73% anhydrous citric acid). This solution is used to impregnate strips of filter paper such as Eaton and Dikeman No. 623. After being air-dried, the treated strips are ready for use. Albumin test papers prepared in this way are buffered to about pH 3. Stability tests on indicator compositions prepared in this manner indicate that they are completely stable for at least five months.

*Example II*

Standard filter paper of medium thickness (about 0.025 in.) is cut into strips of convenient size which are impregnated with a solution having the following composition, and are then air-dried:

Bromphenol blue _____ gm__ 0.002
Phthalic acid _____ gm__ 1.000
Fumaric acid _____ gm__ 1.000
Water _____ ml__ 20

Example III

Strips of filter paper are dipped in a solution having the following composition, and are thereafter air-dried:

| | |
|---|---|
| Bromphenol blue | gm__ 0.002 |
| Aluminum sulphate | gm__ 5.000 |
| Water | ml__ 20 |

Example IV

Strips of filter paper were impregnated with a solution having the following composition and then dried in steam (5 p.s.i. for 15 minutes).

| | Volume, ml. |
|---|---|
| 2.2 parts of 2 molar sodium citrate \} 7.8 parts of 2 molar citric acid | 10 |
| Tetra bromphenol blue (0.08% in 95% ethanol) | 10 |

These strips when dipped in urine from which protein is absent will be colored yellow; in the presence of protein the color is blue-green. Similar tests were conducted using 0.1% tetrabromphenol blue.

Example V

Strips of paper were prepared as in Example IV except that the impregnating solution had the following composition:

| | Volume |
|---|---|
| 2.2 parts of 2 molar Sodium citrate \} 7.8 parts of 2 molar citric acid | 10 |
| Tetra bromphenol blue (0.1% in 95% ethanol) | 8 |
| Tetrabromphenolphthalein ethyl ester (0.1% in 95% ethanol) | 2 |
| External D & C Yellow #1 (0.1% in 95% ethanol) | 0.3 |

The strips of Example V tended in some cases to exhibit somewhat clearer blanks and better contrast.

With the formulation of Examples IV and V, the papers were buffered to pH 2.8 which could be raised to about 3.2 and still get excellent results.

Although we prefer to prepare our indicator compositions by impregnating strips of paper with a solution of the dye and buffer agent, as described in the above examples, because of the obvious convenience of that procedure, we intend to include within the scope of our invention indicator compositions prepared by other methods, such as by adhesively fixing to the surface of the carrier a finely divided, dry, intimate mixture of the dye and the solid buffer agent using any suitable protein-free adhesive such as starch.

Our experience leads us to believe that practically any solid acid may be used in a buffer capacity in the present indicator composition, provided the acid is capable of lowering the pH of the composition below the color-change point of the indicator dye. For instance, in Example I, wherein the color-change point of the dye (tetrabromophenolphthalein ethyl ester) is pH 3.5, the following acids used singly or in combination: tartaric, maleic, ascorbic, salicylic, sulfosalicylic, oxalic, itaconic, gluconic, sulfamic, succinic, benzoic, mandelic, glutaric, malic and phthalic are among those which may be substituted for the citric acid-sodium citrate buffer specifically disclosed.

In Example II, wherein the dye used (bromphenol blue) has a color-change point at pH 3.0, aluminum sulfate or aluminum chloride, or suitable formulations including one or more of the following: salicylic, citric, fumaric, phthalic, malic, tartaric, sulfamic, sulfosalicylic, itaconic, succinic, mandelic, glutaric, and benzoic acids, may be substituted for the phthalic acid-fumaric acid buffer specifically disclosed in that formulation. However, it will be understood by those skilled in the art that all of the acids which are capable of use as buffers with a particular dye will not necessarily be used in the same proportions set forth in the above examples, since a smaller quantity of the stronger acids will be needed to buffer the composition to the pH value required by that dye than will be necessary when weaker acids are used for this purpose.

Although the indicator dyes specifically identified in the above examples are presently preferred, since when buffered as illustrated they produce a sharply defined color-change in the presence of as little as .01% of albumin in the urine being tested, other dyes may also be used in our compositions, provided such dyes exhibit the phenomenon of "protein error" discussed above. Examples of other suitable dyes are bromcresol green, dimethylaminoazobenzene, and Congo red.

In general, we prefer to use dyes in our indicator compositions which exhibit their normal color-change at a pH of 7 or less because of the wide variety of solid acids and acid reacting salts which are available for buffering over a wide pH range below pH 7. However, the invention may be practiced using dyes whose characteristic color-change occurs above pH 7, and in which cases buffers effective in the alkaline range, such as $NaCO_3$—$NaHCO_3$, $NaH_2PO_4$—$Na_2HPO_4$, or $$Na_2HPO_4—Na_3PO_4$$

will be used.

The material which we prefer to use as the carrier in our indicator compositions is paper stock, as noted above, since it is inexpensive and readily available in the degree of purity most suitable for that purpose. However, other absorbent materials, including certain textile fabrics, may be used as the carrier component, if desired.

The mode of use of our indicator compositions will now be described, using the composition of Example I for reference. As indicated above, a test strip prepared according to this example is buffered by means of the sodium citrate-citric acid to a pH of about 3, and at this pH value the indicator dye (tetrabromophenolphthalein ethyl ester) is yellow. In conducting the test for albumin, such a strip is placed into the urine and promptly removed, since the pH of the moistened strip must be dominated by the buffer in the composition. For this reason, the testing strip should only momentarily in contact with the relatively large volume of the urine being tested, in order to avoid any substantial leaching of the buffer from the carrier. Because of the buffer action, the strip, when removed from the urine being tested, retains its yellow color in the absence of protein (albumin). However, in the presence of protein in the amount of 0.01% and above, the dye with which the strip is impregnated will, in response to the protein error, display a blue color, the intensity of the color being an index of the proportion of protein in the urine specimen. The compositions of the examples have a sensitivity to protein in the useful clinical range of 0.01% to over 2.0% of protein.

By the foregoing test procedure good qualitative determinations, and even semi-quantitative determinations of albumin may be obtained. For more accurate results, the dye colors produced by albumin in the urine being tested are compared with a color chart showing the colors exhibited by the same dye when subjected to a number of standard solutions of albumin within the range of albumin concentrations found in urine.

Among the other advantages of the present test is the fact that it is applicable for the detection of albumin in urines which are turbid. For obvious reasons diagnostic tests based on turbidity determinations for the detection of protein in such urines are not satisfactory.

Furthermore, with the present test there will be no "false positives," such as might result when a turbidity type of test is used with a urine containing such materials as X-ray contrast media and the metabolite of tolbutamide, which may form precipitates.

While in the foregoing we have referred to the material whose presence in urine is being detected as "albumin" it is to be understood that in accordance with well-known usage in the art that this term is sometimes used synonymously with "protein." In any event, it is to be understood, that the present test is directed to the detection of a proteinaceous material herein referred to as albumin, but not necessarily restricted to the specific protein having that name.

It will be seen from the foregoing that the invention in its broadest aspects relates to indicator compositions in the form of convenient carrier compositions or bodies having incorporated therewith an indicator dye which exhibits the phenomenon of "protein error" and a solid buffering agent capable of buffering the carrier and the dye to a pH somewhat below the pH value at which the dye normally undergoes its characteristic color-change. Accordingly, it is to be understood that the description and examples set forth hereinabove are intended to define and illustrate, but not to limit the invention to the particular reagents or proportions set forth therein.

This application is a continuation-in-part of copending application Serial No. 585,977, filed May 21, 1956, now abandoned.

We claim:

1. An indicator body for use in determining albumin in liquids, comprising a dry bibulous carrier incorporating the solids remaining from a previous impregnation with a solution of an indicator dye which exhibits protein error and a solid acid reacting material, said dye being present in said solution to the extent of between about 0.005% and about 0.30% by weight, and said acid reacting material being present in said solution to the extent of between about 0.5% and about 25% by weight and in an amount effective, when said body is wetted with the liquid being tested, to buffer said carrier and dye at a point adjacent to, but on the acid side of, the pH at which the color change of said dye normally occurs.

2. Means for detecting albumin in liquids comprising a dry bibulous carrier incorporating the solids remaining from a previous impregnation with a solution containing about 0.05% by weight of tetrabromophenolphthalein ethyl ester, and about 3.5% by weight of a mixture of sodium citrate and citric acid, about 27% of said mixture consisting of sodium citrate dihydrate and the remainder of said mixture consisting of anhydrous citric acid.

3. Means for detecting albumin in liquids comprising a dry, bibulous carrier incorporating the solids remaining from a previous impregnation with a solution having the following composition:

| | |
|---|---|
| Bromphenol blue | gm__ 0.002 |
| Phthalic acid | gm__ 1.000 |
| Fumaric acid | gm__ 1.000 |
| Water | ml__ 20 |

4. Means for detecting albumin in liquids comprising a dry, bibulous carrier incorporating the solids remaining from a previous impregnation with a solution having the following composition:

| | |
|---|---|
| Bromphenol blue | gm__ 0.002 |
| Aluminum sulphate | gm__ 5.000 |
| Water | ml__ 20 |

5. An indicator body for use in determining albumin in liquids, comprising a dry bibulous carrier incorporating the solids remaining from a previous impregnation with a solution of tetrabromphenol blue and a solid acid reacting material effective, when said body is wetted with the liquid being tested, to buffer said carrier and tetrabromphenol blue at a point adjacent to, but on the acid side of, the pH at which the color change of tetrabromphenol blue normally occurs, the tetrabromphenol blue being present in said solution to the extent of between about 0.005% and about 0.30% by weight, and said acid reacting material being present in said solution in an amount effective to maintain the pH of said solution between about 2.8 and about 3.2.

6. Means for determining albumin in liquids comprising a dry bibulous carrier incorporating the solids remaining from a previous impregnation with a solution composed of (a) 10 parts by volume of a sodium citrate-citric acid buffer solution and (b) 10 parts by volume of a solution composed of about 0.08% tetrabromphenol blue in 95% ethanol, said sodium citrate and citric acid components maintaining said first-mentioned solution at a pH between about 2.8 and about 3.2.

7. Means for detecting albumin in liquids comprising a dry, bibulous carrier incorporating the solids remaining from a previous impregnation with a solution composed of a mixture containing essentially (a) 10 ml. of a buffer composed of 2.2 parts of 2 molar sodium citrate and 7.8 parts of 2 molar citric acid, and (b) 10 ml. of an 0.08% solution of tetrabromphenol blue in 95% ethanol.

8. Means for detecting albumin in liquids comprising a dry, bibulous carrier incorporating the solids remaining from a previous impregnation with a solution composed of a mixture containing essentially (a) 10 parts by volume of a buffer composed of 2.2 parts of 2 molar sodium citrate and 7.8 parts of 2 molar citric acid; (b) 8 parts by volume of tetrabromphenol blue (0.1% in 95% ethanol); (c) 2 parts by volume of tetrabromphenolphthalein ethyl ester (0.1% in 95% ethanol); and (d) 0.3 part by volume of External D & C Yellow #1 (0.1% in 95% ethanol).

References Cited in the file of this patent

UNITED STATES PATENTS

| | | |
|---|---|---|
| 2,178,550 | Acree | Nov. 7, 1939 |
| 2,848,308 | Free | Aug. 19, 1958 |

OTHER REFERENCES

Ketomaa et al., "Protein Det. in Spinal Fluid and Urine by pH Ind. Methods," Dept. Med. Chem., Univ. of Helsinki, pages 1 to 4 (1952).

Kolmer, "Approved Lab. Technic," 5th ed., 1951, page 142.

Feigl, "Mikrochimica Acta," vol. II, 1937, pages 107–110.

Kolthoff, "Acid-Base Indicators," pages 368–369, 1937.

Cohen, "Indicators and Test Papers," 1st ed., 1899, pages 180, 181, 207 and 208.